(No Model.)
W. H. HART.
STRAP HINGE.
No. 333,854. Patented Jan. 5, 1886.
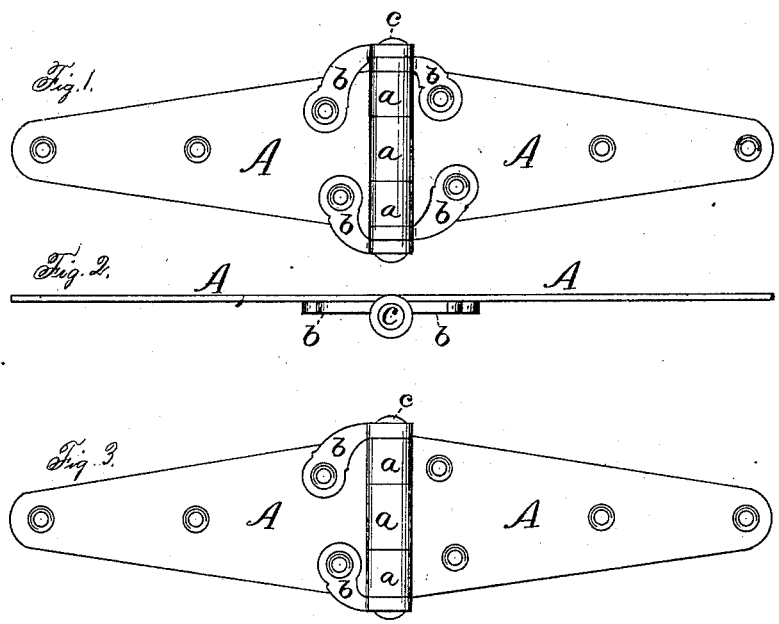
Witnesses.
John Edwards Jr.
E. Dwight Cannon
Inventor.
William H. Hart.
By James Shepard
atty

UNITED STATES PATENT OFFICE.

WILLIAM H. HART, OF NEW BRITAIN, CONNECTICUT, ASSIGNOR TO THE STANLEY WORKS, OF SAME PLACE.

STRAP-HINGE.

SPECIFICATION forming part of Letters Patent No. 333,854, dated January 5, 1886.

Application filed June 7, 1881. Serial No. 35,117. (No model.)

*To all whom it may concern:*

Be it known that I, WILLIAM H. HART, of New Britain, in the county of Hartford and State of Connecticut, have invented certain new and useful Improvements in Strap-Hinges, of which the following is a specification.

My invention relates to improvements in strap-hinges, in which the leaves are provided with the ordinary knuckles and pintle.

In the accompanying drawings, Figure 1 is a front view of my hinge. Fig. 2 is a plan and edge view of the same. Fig. 3 is a front elevation of a hinge with strengthening-wings for only one leaf.

I form the leaves A A and the knuckles $a\,a\,a$ at the joint, the same as in ordinary strap-hinges, and I secure the same together by a pintle, in the usual way. The pintle $c$ is, however, left a little longer than usual for the purpose of receiving upon its ends the strengthening-wings $b\,b\,b\,b$. The body of these wings I prefer to curve around over the leaves A A, but parallel therewith, and with the screw-holes formed in each of said wings directly over those of the ordinary screw-holes of the leaves which are nearest the knuckles $a\,a\,a$, as shown in Figs. 1 and 2. The opposite ends of these wings consist of a round and flattened head of a size equal to that of the knuckles $a\,a\,a$, and occupying a position on the pintle $c$ at the ends of the knuckles, as shown, where they form a substitute for washers. When both leaves are strengthened by means of said wings, they should lap one upon the other, as shown in Figs. 1 and 2.

The wings in Fig. 3 are the same as in Figs. 1 and 2, except that they are only upon one side of the knuckles to support the weakest leaf.

I am aware that strap-hinges have heretofore had strengthening devices applied to the ends of the pintle, one example of which may be seen in the prior patent to myself dated August 12, 1879, and numbered 218,436. Such a hinge is hereby disclaimed.

The advantages of strengthening strap-hinges for out-door use is apparent, and the cost of the strengthening-wings, when constructed of the simple form shown, is but little.

I claim as my invention—

An ordinary strap-hinge consisting of the leaves, pintle, and knuckles $a\,a\,a$, in combination with the strengthening-wings $b$, having round and flattened heads of a size equal to that of the knuckles, and curved bodies which extend from said heads over the outer face of the leaf or leaves, and are provided with a screw-hole at the end opposite said head, substantially as described, and for the purpose specified.

WM. H. HART.

Witnesses:
  WILLIAM PARKER,
  JAMES SHEPARD.